May 6, 1941.　　M. T. GASKILL　　2,241,302
AUTOMATIC TEMPERATURE CONTROL FOR WATER LINES
Filed Aug. 6, 1938　　2 Sheets-Sheet 1
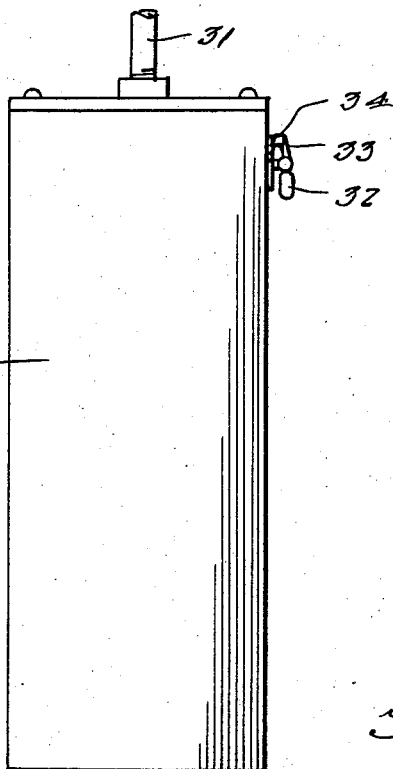
Fig. 1.
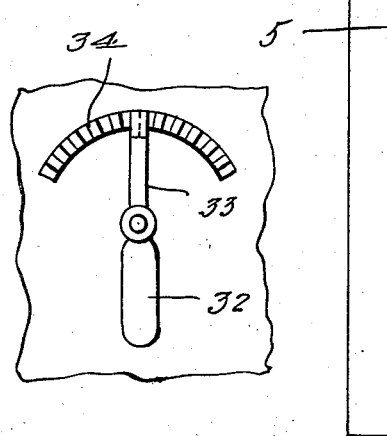
Fig. 6.
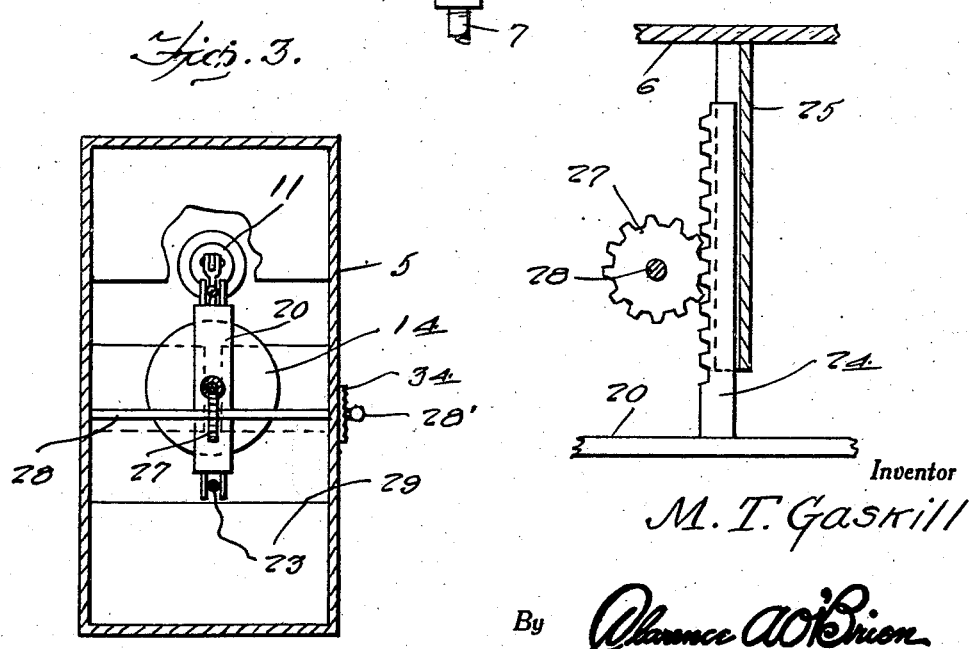
Inventor
M. T. Gaskill
By Clarence A. O'Brien
and Hyman Berman
Attorneys May 6, 1941.   M. T. GASKILL   2,241,302
AUTOMATIC TEMPERATURE CONTROL FOR WATER LINES
Filed Aug. 6, 1938   2 Sheets-Sheet 2

Inventor
M. T. Gaskill
By Clarence A. O'Brien
and Hyman Berman
Attorneys

Patented May 6, 1941

2,241,302

UNITED STATES PATENT OFFICE 2,241,302

AUTOMATIC TEMPERATURE CONTROL FOR WATER LINES

Martin T. Gaskill, Toms River, N. J.

Application August 6, 1938, Serial No. 223,537

1 Claim. (Cl. 236—12)

The present invention relates to automatic temperature control devices for water lines used for domestic purposes, such as the water feed pipes of showers and the like and comprises essentially the provision of a mixing chamber having hot and cold water inlet pipes connected thereto and a discharge pipe leading therefrom together with thermostatically controlled valves for said hot and cold water pipes to regulate the proportion of water supplied to the mixing chamber through said pipes.

An important object of the present invention is to provide a mixing chamber of this character having baffles arranged therein to direct the flow of water from the hot and cold water pipes toward the center of the compartment for proper mixing thereof and positioning the valve controlling thermostat also in the path of the mixed water to effectively regulate the temperature thereof.

A further object is to provide an apparatus of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view of the mixing tank.

Figure 3 is a horizontal sectional view taken substantially on a line 3—3 of Figure 2.

Figure 5 is a fragmentary side elevational view of the regulating rack and pinion for adjusting the thermostat.

Figure 6 is a fragmentary front elevational view of the manual regulator.

Figure 2:
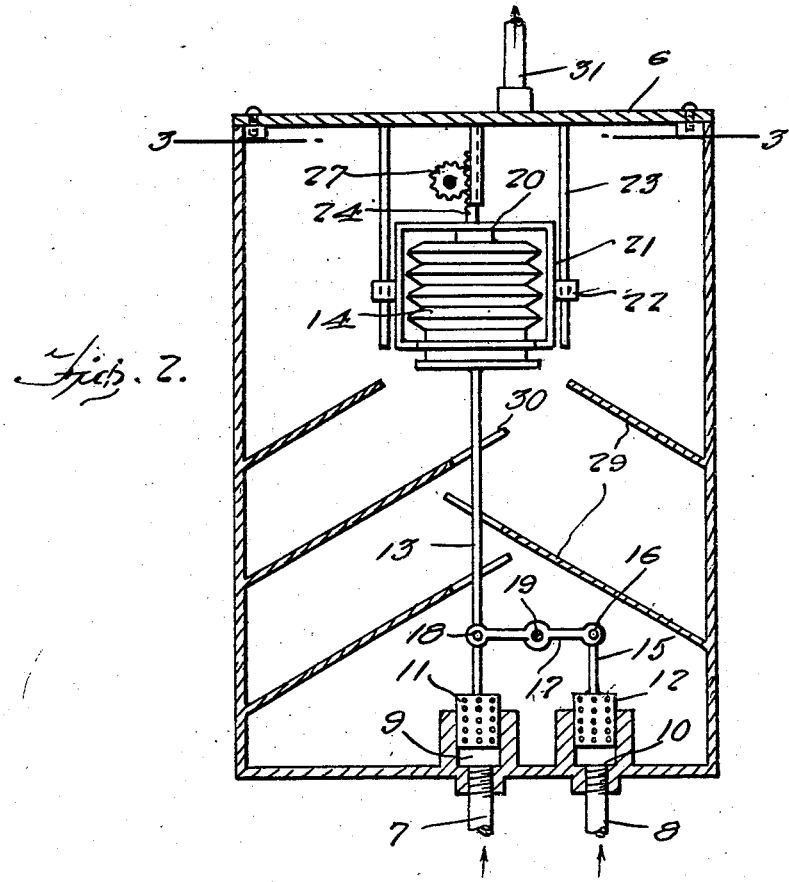
Figure 2 is a vertical sectional view therethrough.
Figure 4:
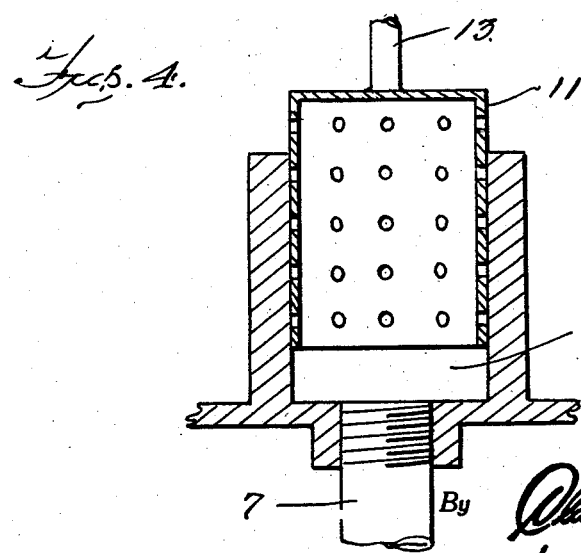
Figure 4 is a longitudinal sectional view through one of the control valves.

Referring now to the drawings in detail, wherein for the purpose of illustration I have disclosed a preferred embodiment of the invention, the numeral 5 designates a tank having a removable cover 6 suitably secured thereto, the bottom of the tank having hot and cold water pipes 7 and 8 respectively, threaded therein, and communicating respectively with valve chambers 9 and 10. The valve chambers are in the form of cylinders within which cylindrical valves 11 and 12 have a working fit, said valves having perforated side walls open at their bottoms and closed at their top portions and the valve 11 is connected at its top portion with a vertically extending rod 13 having a thermostat 14 attached at its upper end, said thermostat being of the conventional bellows type as shown in Figure 2 of the drawings.

To the top of the valve 12 is also provided an upstanding rod 15 pivoted as at 16 to one end of a link 17 which has its opposite end pivoted as at 18 to the rod 13, the link being pivoted intermediate its ends as at 19 to a rod secured to one of the side walls of the tank.

The thermostat 14 is free at its lower end and has its upper end fixedly secured to an adjustable frame 20, the lower end of the frame forming a guide for the free end of the bellows of the thermostat to brace the same and said frame including side portions 21 having guide brackets 22 projecting outwardly therefrom and slidably engaging rods 23 depending from the top 6. Rising from the frame 20 is a rack bar 24 slidably positioned in a guide 25 also depending from the top 6 of the tank and arranged in engagement with the rack is pinion 27 fixed on a shaft 28 which projects outwardly through the front wall of the tank and provided with a manually operable regulating indicator of conventional construction 28'.

The indicator includes a handle portion 32 and a spring arm 33 having its outer end in spring pressed engagement with a notched quadrant 34 secured to the front surface of the tank.

Arranged within the tank and secured to the opposite side walls thereof are upwardly inclined baffles 29 having their free ends terminating adjacent the center of the tank and arranged in staggered relation as shown in Figure 2, certain of the baffles having their free ends provided with slots 30 to accommodate the rod 13. From the top 6 of the tank extends a discharge pipe 31 leading to a shower nozzle (not shown) or other device connected to the tank for utilizing the regulated water passing therethrough.

In the operation of the device the frame 20 to which the thermostat 14 is secured may be properly adjusted to raise one of the valves and lower the other valve to admit a predetermined volume of hot and cold water into the tank, and the thermostat 14 will automatically control the further admission of the hot and cold water by its expansion or contracting movement and through its connection with the rod 13, link 16 and rod 15 serve to alternately open and close the valves 11 and 12 in a manner as will be apparent.

The baffles 29 will direct the incoming water toward the center of the tank for properly mixing the same, and since the thermostat is also positioned adjacent the center of the tank and in the path of the mixed water, the temperature thereof will be more efficiently regulated.

Having thus described the invention, what I claim is:

An automatic temperature regulator for water lines comprising a tank having hot and cold water pipes connected to the bottom of the tank, a discharge pipe leading from the top of tank, valve chambers within the tank communicating with the respective hot and cold water pipes, said chambers being in the form of cylinders, cylindrical valves having a working fit in said cylinders, said valves being open at their bottom and having perforated side walls and closed at their top, rods rising from the top of the valves, a link pivotally mounted intermediate its ends and having its end portions pivoted to each of said rods for oppositely actuating the valves, a thermostat attached at one end to one of said rods, a frame secured to the other end of the thermostat guide means on opposite sides of the frame, a pair of guide rods extending downwardly from the top of the tank with which the guide means are engaged for vertical sliding movement, a rack rising from the top of the frame, a guide for the rack also extending downwardly from the top of the tank and a manually operated pinion engaging the rack for slidably actuating the frame.

MARTIN T. GASKILL.